United States Patent
Lin et al.

(10) Patent No.: US 8,917,077 B2
(45) Date of Patent: Dec. 23, 2014

(54) MULTI-PHASE SWITCHING REGULATOR AND DROOP CIRCUIT THEREFOR

(71) Applicants: Yu-Ta Lin, New Taipei (TW);
Jian-Rong Huang, Hsinchu (TW);
Yi-Cheng Wan, Taoyuan (TW);
Chien-Hui Wang, Hsinchu (TW);
Yuan-Wen Hsiao, Taichung (TW)

(72) Inventors: Yu-Ta Lin, New Taipei (TW);
Jian-Rong Huang, Hsinchu (TW);
Yi-Cheng Wan, Taoyuan (TW);
Chien-Hui Wang, Hsinchu (TW);
Yuan-Wen Hsiao, Taichung (TW)

(73) Assignee: Richtek Technology Corporation, Chupei, Hsinchu (TW)

(*) Notice: Subject to any disclaimer, the term of this patent is extended or adjusted under 35 U.S.C. 154(b) by 57 days.

(21) Appl. No.: 13/938,154

(22) Filed: Jul. 9, 2013

(65) Prior Publication Data
US 2014/0021929 A1   Jan. 23, 2014

(30) Foreign Application Priority Data
Jul. 23, 2012   (TW) .............................. 101214140 U

(51) Int. Cl.
*G05F 1/00*   (2006.01)
*G05F 1/10*   (2006.01)

(52) U.S. Cl.
CPC ........................................ *G05F 1/10* (2013.01)
USPC ........................................... 323/285; 323/271

(58) Field of Classification Search
USPC .................. 323/222–225, 266–275, 282–285
See application file for complete search history.

(56) References Cited

U.S. PATENT DOCUMENTS

| | | | | |
|---|---|---|---|---|
| 6,246,220 B1* | 6/2001 | Isham et al. | .................. | 323/224 |
| 6,414,469 B1* | 7/2002 | Zhou et al. | .................... | 323/272 |
| 6,683,441 B2* | 1/2004 | Schiff et al. | .................. | 323/222 |
| RE38,940 E * | 1/2006 | Isham et al. | .................. | 323/224 |
| 7,064,528 B2* | 6/2006 | Jochum et al. | ................ | 323/266 |
| RE42,532 E * | 7/2011 | Isham et al. | .................. | 323/284 |
| 8,710,810 B1* | 4/2014 | McJimsey et al. | ............ | 323/272 |
| 2002/0089314 A1* | 7/2002 | Susak et al. | .................... | 323/235 |
| 2004/0095104 A1* | 5/2004 | Brooks | ........................ | 323/272 |
| 2005/0001597 A1* | 1/2005 | Walters et al. | ................ | 323/222 |
| 2005/0024033 A1* | 2/2005 | Nakata | .......................... | 323/282 |
| 2005/0194951 A1* | 9/2005 | Mehas et al. | .................. | 323/282 |
| 2006/0001408 A1* | 1/2006 | Southwell et al. | ........... | 323/282 |
| 2006/0017424 A1* | 1/2006 | Wood et al. | .................... | 323/274 |
| 2006/0279350 A1* | 12/2006 | Zhang et al. | .................. | 327/407 |
| 2007/0013350 A1* | 1/2007 | Tang et al. | .................... | 323/237 |
| 2007/0108949 A1* | 5/2007 | Ohoka | ........................ | 323/271 |
| 2007/0216372 A1* | 9/2007 | Weng et al. | .................... | 323/222 |
| 2008/0238390 A1* | 10/2008 | Trivedi et al. | ................. | 323/283 |
| 2009/0051334 A1* | 2/2009 | Huang | .......................... | 323/247 |
| 2010/0231187 A1* | 9/2010 | Wicht et al. | .................. | 323/282 |
| 2012/0161741 A1* | 6/2012 | Zambetti | ....................... | 323/294 |
| 2012/0286750 A1* | 11/2012 | Xu | ................................. | 323/282 |
| 2013/0057237 A1* | 3/2013 | Chen et al. | .................... | 323/271 |
| 2013/0057239 A1* | 3/2013 | Kalje et al. | .................... | 323/271 |
| 2013/0057240 A1* | 3/2013 | Zambetti et al. | ............. | 323/271 |

* cited by examiner

*Primary Examiner* — Timothy J Dole
*Assistant Examiner* — Yusef Ahmed
(74) *Attorney, Agent, or Firm* — Tung & Associates

(57) ABSTRACT

The present invention provides a multi-phase switching regulator and a droop circuit for use in the multi-phase switching regulator. The multi-phase switching regulator generates pulse width modulation (PWM) signals according to an output voltage and a droop signal, to drive a plurality of switching sets to convert an input voltage to the output voltage. The droop circuit detects the sum of the currents generated by the plurality of switching sets and provides the droop signal which is related to the sum of the currents to the multi-phase switching regulator. The droop signal can be used for over current protection (OCP) or for the droop control.

10 Claims, 6 Drawing Sheets

US 8,917,077 B2

MULTI-PHASE SWITCHING REGULATOR AND DROOP CIRCUIT THEREFOR

CROSS REFERENCE

The present invention claims priority to TW 101214140, filed on Jul. 23, 2012.

BACKGROUND OF THE INVENTION

1. Field of Invention

The present invention relates to a multi-phase switching regulator and a droop circuit therefor; particularly, it relates to such multi-phase switching regulator and droop circuit which can sense a total current generated by multiple switch sets and adjust an output voltage accordingly.

2. Description of Related Art

FIG. 1 shows a schematic diagram of a multi-phase switching regulator disclosed by U.S. Pat. No. 6,683,441. As shown in FIG. 1, a summing circuit 25 includes two resistors having the same resistance Rp. Each of the two resistors has one end connected to a corresponding phase node, and the other end connected to a summing node 26 in common. An amplifier circuit includes an operational amplifier A1, which has an inverting input connected to the summing node 26, and a non-inverting input connected to an output voltage Vout. A resistor Rcs (having a resistance Rcs), which is connected in parallel with a capacitor Ccs (having a capacitance Ccs), sets the gain of the operational amplifier A1. When so arranged, the output voltage Vcs produced by the operational amplifier A1 is given by:

$$V_{cs} = V_{out} - \frac{R_{cs}R_1\left(1 + s\frac{L}{R_1}\right)}{R_p(1 + sC_{cs}R_{cs})}I_{out}$$

wherein L is the inductance of the inductor; R1 is the parasitic resistance of the inductor; s is a variable of Laplace Transform, and Iout is the total output current. If the time constant Ccs*Rcs is made substantially equal to the time constant L/R1 of the inductor, and the output voltage Vout term is subtracted from the output Vcs of the operational amplifier A1 by a summing circuit 30, which receives Vcs at one input, Vout at another input, a droop voltage Vdroop is generated which is given by:

$$V_{droop} = V_{cs} - V_{out} = -\frac{R_{cs}R_1}{R_p}I_{out}$$

Thus, Vdroop is directly proportional to the total output current Iout. The droop voltage Vdroop may be used to provide various functions. For one example, over current protection (OCP) can be achieved by detecting the total current. For another example, in some applications it is required to control the relationship between the output current and the output voltage. In such case, the output voltage Vout can be adjusted according to the droop voltage Vdroop, to achieve the so-called droop control.

The aforementioned prior art requires a large capacitance Ccs and a large resistance Rcs, so the capacitor and resistor can not be integrated in an integrated circuit (IC) chip, and the IC chip needs to be provided with pins for connecting with the capacitor and the resistor. Certainly, this will increase the cost.

FIG. 2 shows a schematic diagram of a droop circuit disclosed by U.S. Pat. No. 7,064,528. As shown in FIG. 2, multiple phase nodes PH1-PHN are coupled to corresponding resistors R1-RN respectively, and the other ends of the resistors are coupled to a non-inverting input of an operational amplifier A2 in common. The output voltage Vout is coupled to an inverting input of the operational amplifier A2 via a resistor RA. A capacitor CA is coupled between the non-inverting input of the operational amplifier A2 and the output voltage Vout. A feedback resistor RB is coupled between the inverting input of the operational amplifier A2 and an output end of the operational amplifier A2. A feedback resistor RC is coupled between the non-inverting input of the operational amplifier A2 and the output voltage Vout. A capacitor CB is coupled between the output voltage Vout and the output end of the operational amplifier A2. The droop voltage Vdroop is the voltage between the output end of the operational amplifier A2 and the output voltage Vout.

Similarly, the droop voltage Vdroop may be set proportional to a total output current (not shown) by proper settings of various parameters of the devices of the droop circuit, such that the droop voltage Vdroop may provide functions such as OCP, droop control, or serve for other purposes.

FIG. 3 shows a schematic diagram of a droop circuit disclosed by US Publication No. 2009/0051334. As shown in FIG. 3, multiple phase nodes PH1-PHN are coupled to corresponding resistors RPH1-RPHN respectively, and the other ends of the resistors are coupled to a non-inverting input of an amplifier 520. The output voltage Vout is coupled to an inverting input of the amplifier 520 via a resistor RCS. A capacitor C1 is coupled between the non-inverting input of the amplifier 520 and the output voltage Vout. An output end of the amplifier 520 generates a droop current as below:

$$I_{droop} = \frac{\frac{I_{out} \times DCR}{N}}{RCS}$$

wherein N is a number of the phase nodes; Iout is the total output current; DCR is a parasitic resistance of each inductor L1-LN. The droop current Idroop is proportional to the total output current Iout, so it can be used for functions such as OCP and droop control.

In the prior art circuits shown in FIG. 2 and FIG. 3, a current path is formed between the amplifier and the output node. If the current path is required to detect a negative current, an offset voltage needs to be provided in the current detection circuit. This offset voltage will deliver a current to the output voltage under discontinuous conduct mode (DCM) or in low load condition, thus charging the output voltage to an undesired high voltage level. In other words, these two prior art circuits have the problem of output voltage instability, in particular in the aforementioned case.

In view of the above, to overcome the drawbacks in the prior art, the present invention proposes a multi-phase switching regulator and a droop circuit for the multi-phase switching regulator, which increase the flexibility of the circuit design and improves the stability of the output voltage.

SUMMARY OF THE INVENTION

From one perspective, the present invention provides a multi-phase switching regulator, comprising: a plurality of switch sets for generating an output voltage at an output node, wherein each switch set includes at least one power switch and a phase node, and each switch set receives a corresponding driving signal to operate the corresponding at least one power switch thereof for generating the output voltage; a plurality of output inductors, which are coupled between the corresponding phase nodes and the output node respectively; a pulse width modulation (PWM) circuit for generating a plurality of PWM signals to control the plurality of switch sets; and a droop circuit for providing a droop signal, the droop signal being related to a sum of currents through the phase nodes, the droop circuit including: a plurality of phase resistors, which are respectively coupled between the corresponding phase nodes and a common node, and each of which is for sensing a current generated by the corresponding switching set through the corresponding phase node; a droop capacitor, which is coupled between the common node and the output node; a phase buffer circuit, which has a common node terminal coupled to the common node for receiving a common node voltage at the common node, wherein the phase buffer circuit generates a first voltage according to the common node voltage; an output buffer circuit, which has an output node terminal coupled to the output node for receiving the output voltage, wherein the output buffer circuit generates a second voltage according to the output voltage; and a converter circuit, which receives the first voltage and the second voltage and generates the droop signal; wherein there is no substantial current flowing through the common node terminal and the output node terminal.

From another perspective, the present invention provides a droop circuit for use in a multi-phase switching regulator, the multi-phase switching regulator comprising a plurality of switch sets, a plurality of output inductors, a pulse width modulation (PWM) circuit, and the droop circuit, the plurality of switch sets being for generating an output voltage at an output node, wherein each switch set includes at least one power switch and a phase node, and each switch set receives a corresponding driving signal to operate the corresponding at least one power switch thereof for generating the output voltage; the plurality of output inductors being coupled between the corresponding phase nodes and the output node respectively; the PWM circuit being for generating a plurality of PWM signals to control the plurality of switch sets; the droop circuit being for providing a droop signal, and the droop circuit comprising: a plurality of phase resistors, which are respectively coupled between the corresponding phase nodes and a common node, and each of which is for sensing a current generated by the corresponding switching set through the corresponding phase node; a droop capacitor, which is coupled between the common node and the output node; a phase buffer circuit, which has a common node terminal coupled to the common node for receiving a common node voltage at the common node, wherein the phase buffer circuit generates a first voltage according to the common node voltage; an output buffer circuit, which has an output node terminal coupled to the output node for receiving the output voltage, wherein the output buffer circuit generates a second voltage according to the output voltage; and a converter circuit, which receives the first voltage and the second voltage and generates the droop signal; wherein the droop signal is related to a sum of currents through the plurality of phase nodes.

In one embodiment, the phase buffer circuit includes a metal-oxide-semiconductor (MOS) device or a bipolar junction transistor (BJT) device, and the output buffer circuit includes a metal-oxide-semiconductor (MOS) device or a bipolar junction transistor (BJT) device.

In one embodiment, the converter circuit includes a resistor.

In the above-mentioned embodiment, the converter circuit preferably further comprises: a first current mirror circuit coupled to the phase buffer circuit, for generating a first current mirror signal according to the first voltage; a second current mirror circuit coupled to the output buffer circuit, for generating a second current mirror signal according to the second voltage; and a third current mirror circuit coupled to the first current mirror circuit and the second current mirror circuit, for generating the droop signal according to the first current mirror signal and the second current mirror signal.

Preferably, the first current mirror circuit comprises a first constant current source for providing a first constant current and a second constant current source for providing a second constant current, the first constant current source being coupled to a first carrier inflow terminal of the phase buffer circuit and being for providing the first constant current flowing through the first carrier inflow terminal, the second constant current source being coupled to a first carrier outflow terminal of the phase buffer circuit and being for providing the second constant current flowing through the first carrier outflow terminal; and the second current mirror circuit comprises a third constant current source for providing a third constant current and a fourth constant current source for providing a fourth constant current, the third constant current source being coupled to a second carrier inflow terminal of the output buffer circuit and being for providing the third constant current flowing through the second carrier inflow terminal, the fourth constant current source being coupled to a second carrier outflow terminal of the output buffer circuit and being for providing the fourth constant current flowing through the second carrier outflow terminal; wherein the third constant current is substantially the same as the first constant current and the fourth constant current is substantially the same as the second constant current.

The objectives, technical details, features, and effects of the present invention will be better understood with regard to the detailed description of the embodiments below.

DESCRIPTION OF THE PREFERRED EMBODIMENTS

Figure 1:
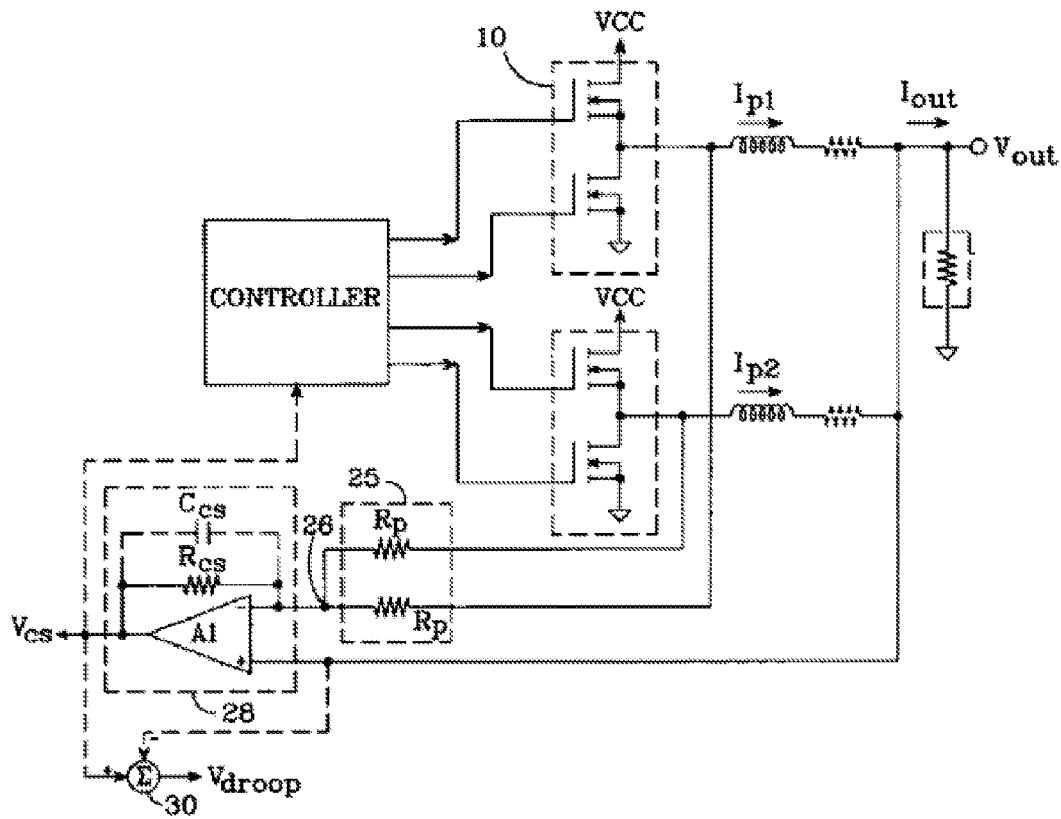
FIG. 1 shows a schematic circuit diagram of a conventional multi-phase switching regulator disclosed in U.S. Pat. No. 6,683,441.
Figure 2:
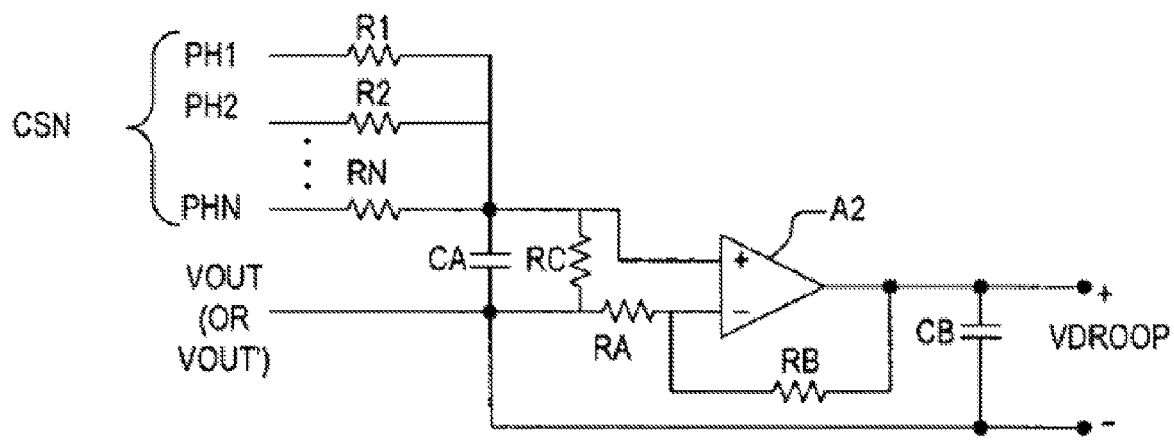
FIG. 2 shows a schematic diagram of a conventional droop amplifier circuit disclosed in U.S. Pat. No. 7,064,528.
Figure 3:
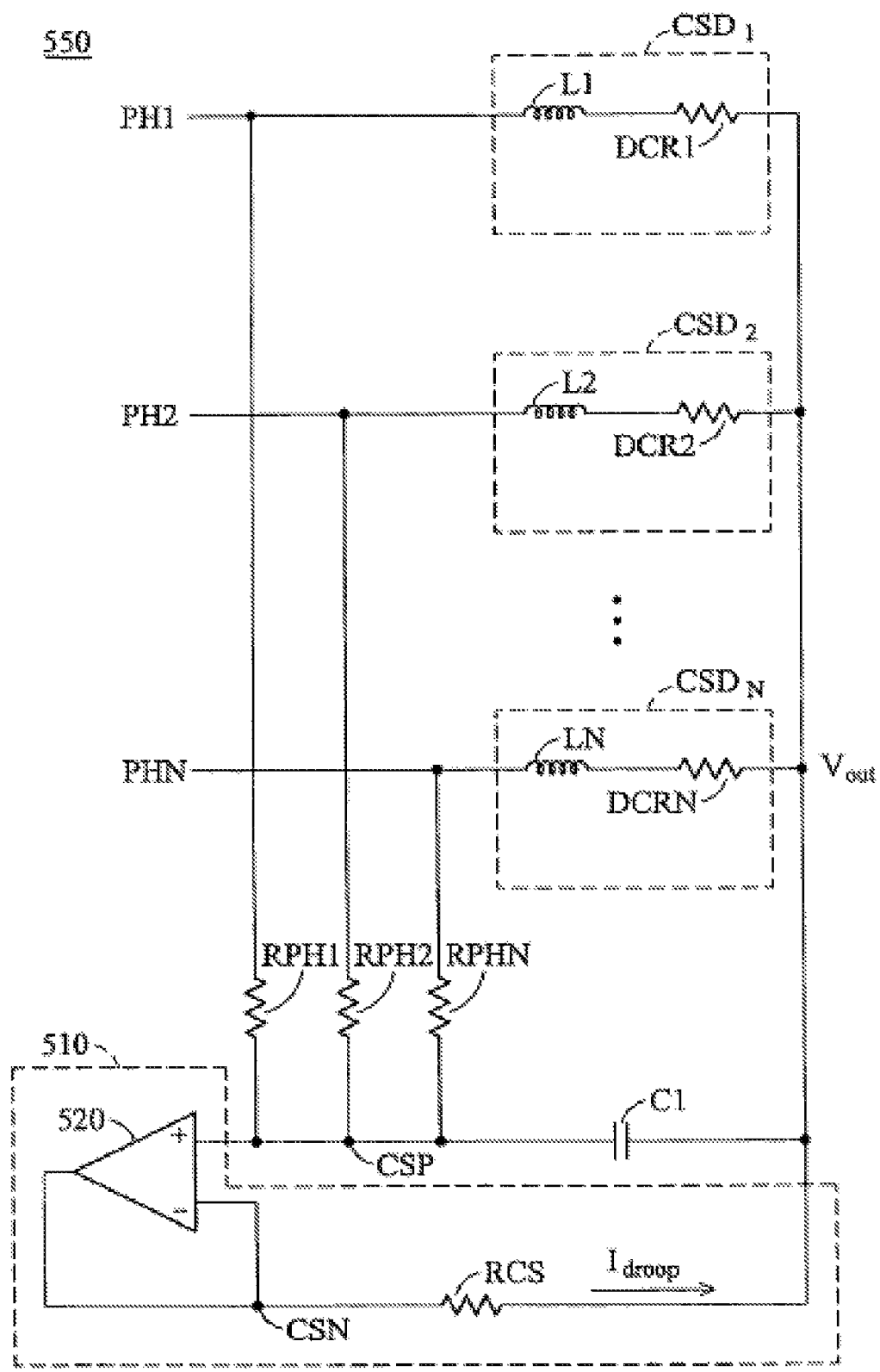
FIG. 3 shows a schematic diagram of a conventional droop amplifier circuit disclosed in U.S. Pat. Pub. No. 2009/0051334.
Figure 4:
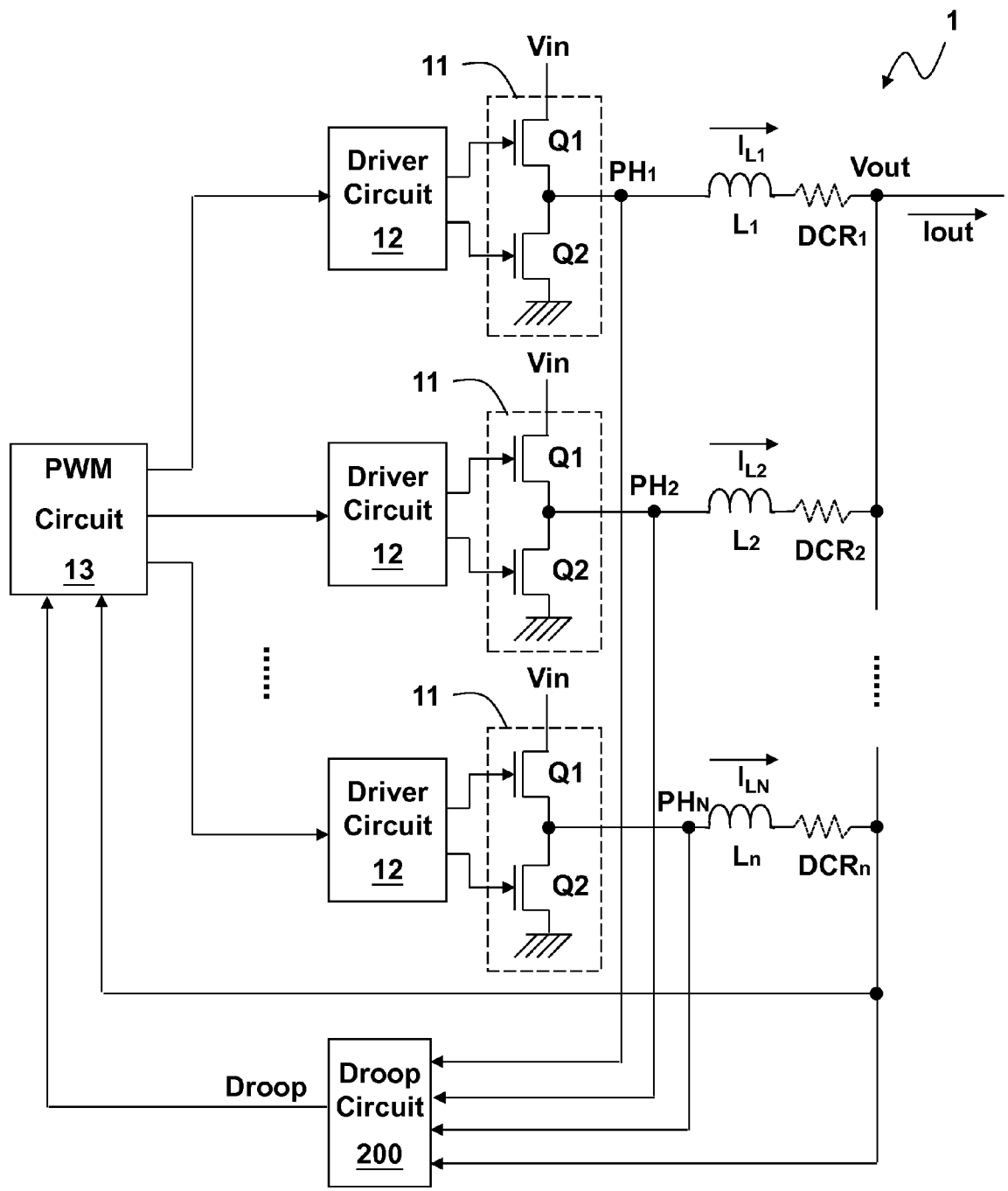
FIG. 4 shows a multi-phase switching regulator according to an embodiment of the present invention.

Please refer to FIG. 4, which shows an embodiment of the present invention. As shown in the figure, the multi-phase switching regulator 1 comprises plural switching sets 11, plural output inductors L1-Ln, plural driver circuits 12, a pulse width modulation (PWM) circuit 13 and a droop circuit 200. The PWM circuit 13 generates plural PWM signals according to an output voltage Vout and a droop signal Droop, which are respectively inputted to the corresponding driver circuits 12. The driver circuits 12 generate driving signals to respectively control the corresponding switching sets 11. The function of a driver circuit 12 is to provide a driving signal with a voltage level high enough to drive the corresponding switch set 11. If the PWM signals generated by the PWM circuit 13 have a voltage level high enough to drive the switch sets 11, the diver circuit 12 may be omitted (or integrated in the PWM circuit 13). Each switching set 11 includes, for example but not limited to, an upper-gate switch Q1 and a lower-gate switch Q2 (the lower-gate switch Q2 can be replaced by a diode device). Each switching set 11 converts the input voltage Vin to the output voltage Vout according to a corresponding driving signal. Each switching set 11 has a corresponding phase node PH1, PH2, . . . , or PHN. Each of the output inductors L1-Ln is respectively coupled between a corresponding phase node PH1-PHN and the output node Vout. The output inductors L1-Ln have inductances L1-Ln and parasitic resistances DCR1-DCRn respectively. The droop circuit 200 is coupled to the phase nodes PH1-PHN, to sense the currents IL1-ILn generated by the switching sets 11 at the phase nodes $PH_1$-$PH_N$ and provide the above-mentioned droop signal Droop. This droop signal Droop can be provided to, for example, the PWM circuit 13 (as shown in FIG. 4), or other circuits, for example, the load circuit (not shown). The droop signal Droop is related to a sum of the currents generated by the plural phases (i.e., the total current).

Figure 5:
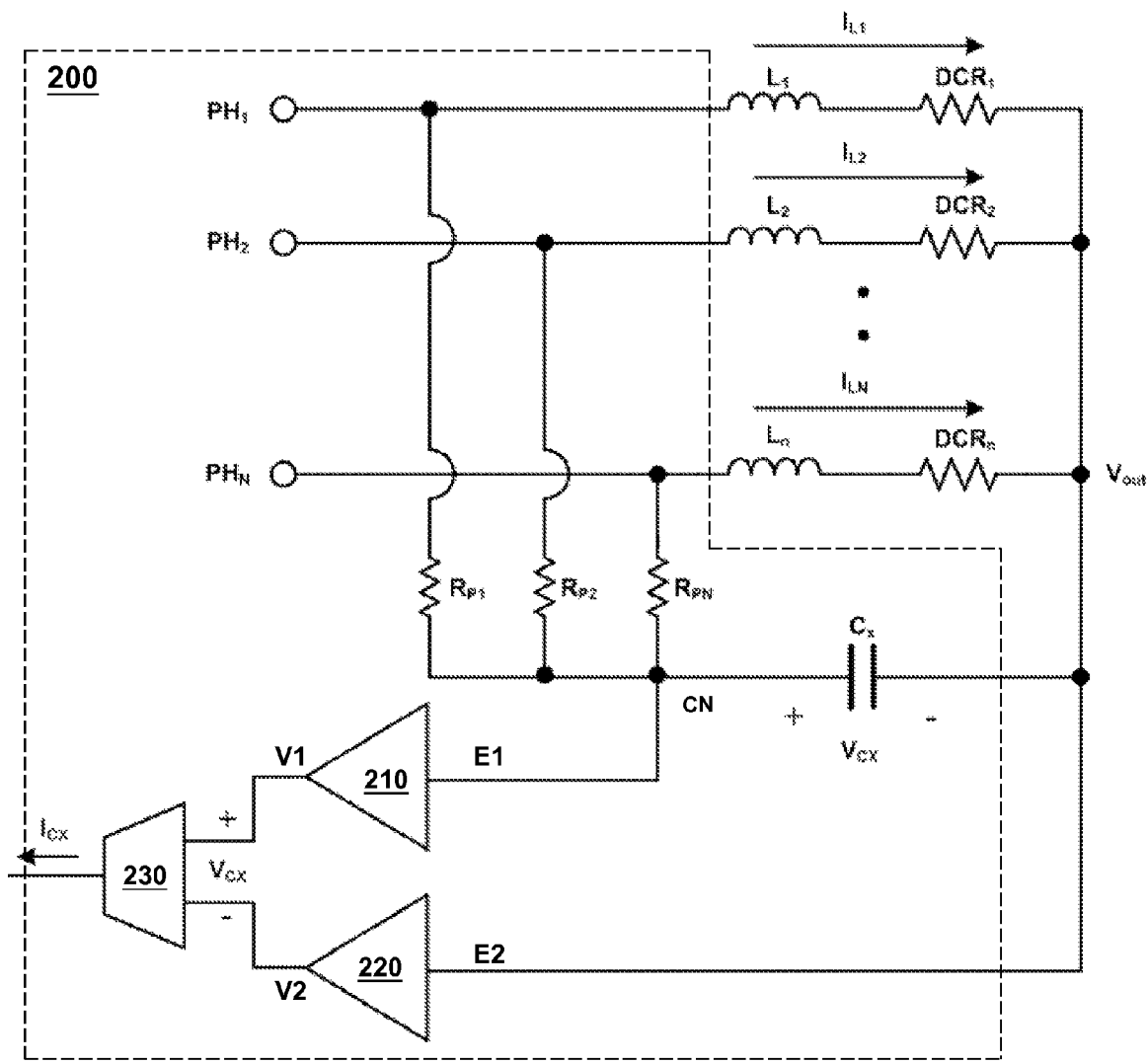
FIG. 5 shows a droop circuit according to an embodiment of the present invention.

FIG. 5 shows a droop circuit according to an embodiment of the present invention. As shown in the figure, the droop circuit 200 includes plural phase resistors RP1-RPN, a droop capacitor Cx, a phase buffer circuit 210, an output buffer circuit 220 and a converter circuit 230. Each of the phase resistors RP1-RPN is respectively coupled between the corresponding phase node PH1-PHN and a common node CN for sensing a current IL1-ILN flowing through the corresponding phase node PH1-PHN. The droop capacitor Cx is coupled between the common node CN and the output node Vout; it has a capacitor voltage Vcx across its two ends. The phase buffer circuit 210 has a common node terminal E1 which is coupled to the common node CN for receiving a common node voltage at the common node CN. The phase buffer circuit 210 generates a first voltage V1 according to the common node voltage. The output buffer circuit 220 has an output node terminal E2 which is coupled to the output node Vout is for receiving the output voltage Vout. The output buffer circuit 220 generates a second voltage V2 according to the output voltage Vout. The first voltage V1 and the second voltage V2 are received by the converter circuit 230. The voltage difference between the first voltage V1 and the second voltage V2 is, for example but not limited to, the same as the voltage difference across the droop capacitor Cx, both of which are the capacitor voltage Vcx shown in FIG. 5. The converter circuit 230 generates a droop current Icx according to this capacitor voltage Vcx; the droop current Icx can be used as the droop signal Droop, because it is related to a sum of the currents generated by the plural phases through the phase nodes PH1-PHN. Note that there is no substantial current flowing through the common node terminal E1 and the output node terminal E2.

Please refer again to FIG. 5. Assuming that s is a variable of Laplace Transform and n is the number of the switching sets, when n is equal to 2, the equation is given by:

$$\frac{V_{cx} - I_{L1}(sL_1 + DCR_1)}{R_{p1}} + \frac{V_{cx} - I_{L2}(sL_2 + DCR_2)}{R_{p2}} = -sC_xV_{cx}$$

Now, assuming that: the output inductors L1 and L2 both have the same capacitance L; the parasitic resistor DCR1 of the output inductors L1 and the parasitic resistor DCR2 of the output inductors L2 both have the same resistance DCR; the resistors Rp1 and Rp2 both have the same resistance Rp, then the above-mentioned equation is simplified as:

$$V_{cx}\left(\frac{2}{R_p} + sC_x\right) = \frac{I_{TOTAL}(sL + DCR)}{R_p}$$

wherein ITOTAL is the sum of the output currents, i.e., the total current. And when the number of the switching sets is equal to n, the equation is given by:

$$V_{cx}\left(\frac{n}{R_p} + sC_x\right) = \frac{I_{TOTAL}(sL + DCR)}{R_p}$$

The above equation is differentiated to obtain the following equation:

$$I_{total} \cdot \frac{DCR}{n}\left(\frac{1 + s\frac{L}{DCR}}{1 + s\frac{CR}{n}}\right) = V_{cx}$$

By proper design such that:

$$\frac{L}{DCR} = \frac{CR}{n}$$

then the above-mentioned equation is simplified as:

$$\frac{I_{total} \cdot DCR}{n} = V_{cx}$$

By the above equation, the voltage Vcx is positively related to the total current Itotal and it can be used as the droop signal Droop. Certainly, the current Icx or a current (or a multiple thereof) generated by applying the voltage Vcx on a resistor having a know resistance can also be used as the droop signal Droop.

Figure 6:
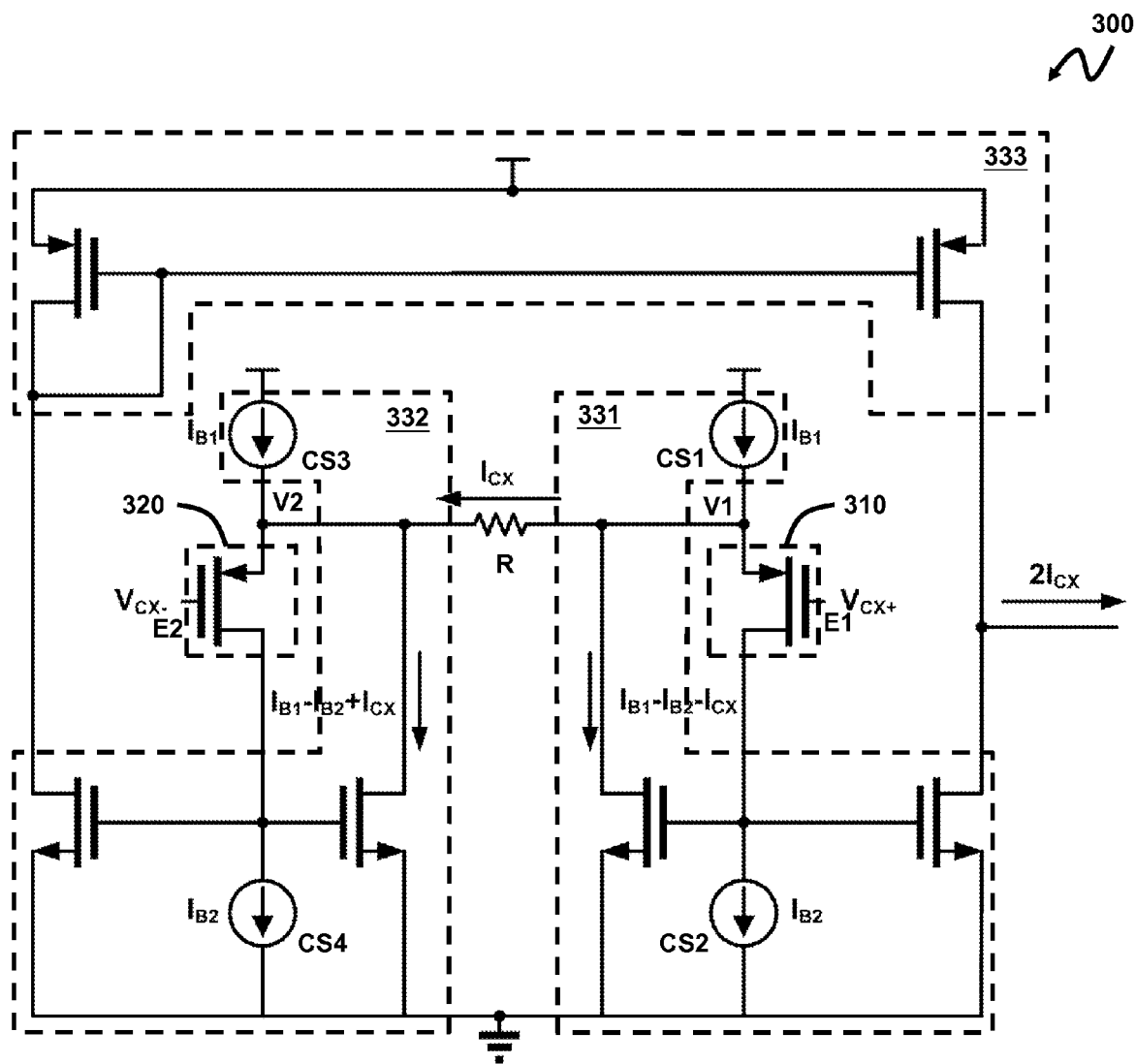
FIG. 6 shows a droop circuit according to another embodiment of the present invention.

FIG. 6 shows an embodiment of a droop circuit 300 which comprises a phase buffer circuit 310, an output buffer circuit 320 and a converter circuit. The phase buffer circuit 310 includes, for example but not limited to, a P-type metal-oxide-semiconductor (PMOS) device. The output buffer circuit 320 also includes, for example but not limited to, a PMOS device as shown in FIG. 6. The converter circuit includes a resistor R. When the common node terminal E1 of the phase buffer circuit 310 (e.g., the gate of the PMOS device) receives the common node voltage Vcx+ at the common node CN, the carrier inflow terminal of the phase buffer circuit 310 (e.g., the source of the PMOS device) generates a first voltage V1 at one end of the resistor R according to the common node voltage Vcx+. Also, when the output node terminal E2 of the output buffer circuit 320 (e.g., the gate of the PMOS device) receives the output voltage Vcx− at the output node Vout, the second carrier inflow terminal of the output buffer circuit 320 (e.g., the source of the PMOS device) generates a second voltage V2 at another end of the resistor R according to the output voltage Vcx−. Accordingly, the voltage difference across the resistor R is substantially the same as the capacitor voltage Vcx. The droop current Icx flowing through the resistor R (or a multiple of the current Icx) can be used as the droop signal Droop.

Please refer again to FIG. 6. In addition to the resistor R, the converter circuit of this embodiment further includes a first current mirror circuit 331, a second current mirror circuit 332 and a third current mirror circuit 333. As shown in FIG. 6, the first current mirror circuit 331 is coupled to the phase buffer circuit 310. The first current mirror circuit 331 comprises two NMOS devices coupled with each other, a first constant current source CS1 and a second constant current source CS2. The first constant current source CS1 provides a first constant current IB1, and the second constant current source CS2 provides a second constant current IB2. The first current mirror circuit 331 generates a first current mirror signal IB1-IB2−Icx according to the first voltage V1 and the droop current Icx generated on the resistor R. In addition, the second current mirror circuit 332 comprises two NMOS devices coupled with each other, a third constant current source CS3 and a fourth constant current source CS4. The third constant current source CS3 provides a third constant current IB1; in this embodiment, the third constant current IB1 is substantially the same as the first constant current IB1. The fourth constant current source CS4 provides a fourth constant current IB2; in this embodiment, the fourth constant current IB2 is substantially the same as the second constant current IB2. The second current mirror circuit 332 generates a second current mirror signal IB1-IB2+Icx according to the second voltage V2 and the droop current Icx generated on the resistor R. The third current mirror circuit 333 is coupled to the first current mirror circuit 331 and the second current mirror circuit 332, and it subtracts the first current mirror signal IB1-IB2−Icx from the second current mirror signal IB1-IB2+Icx, to generate the droop signal 2Icx.

Figure 7:
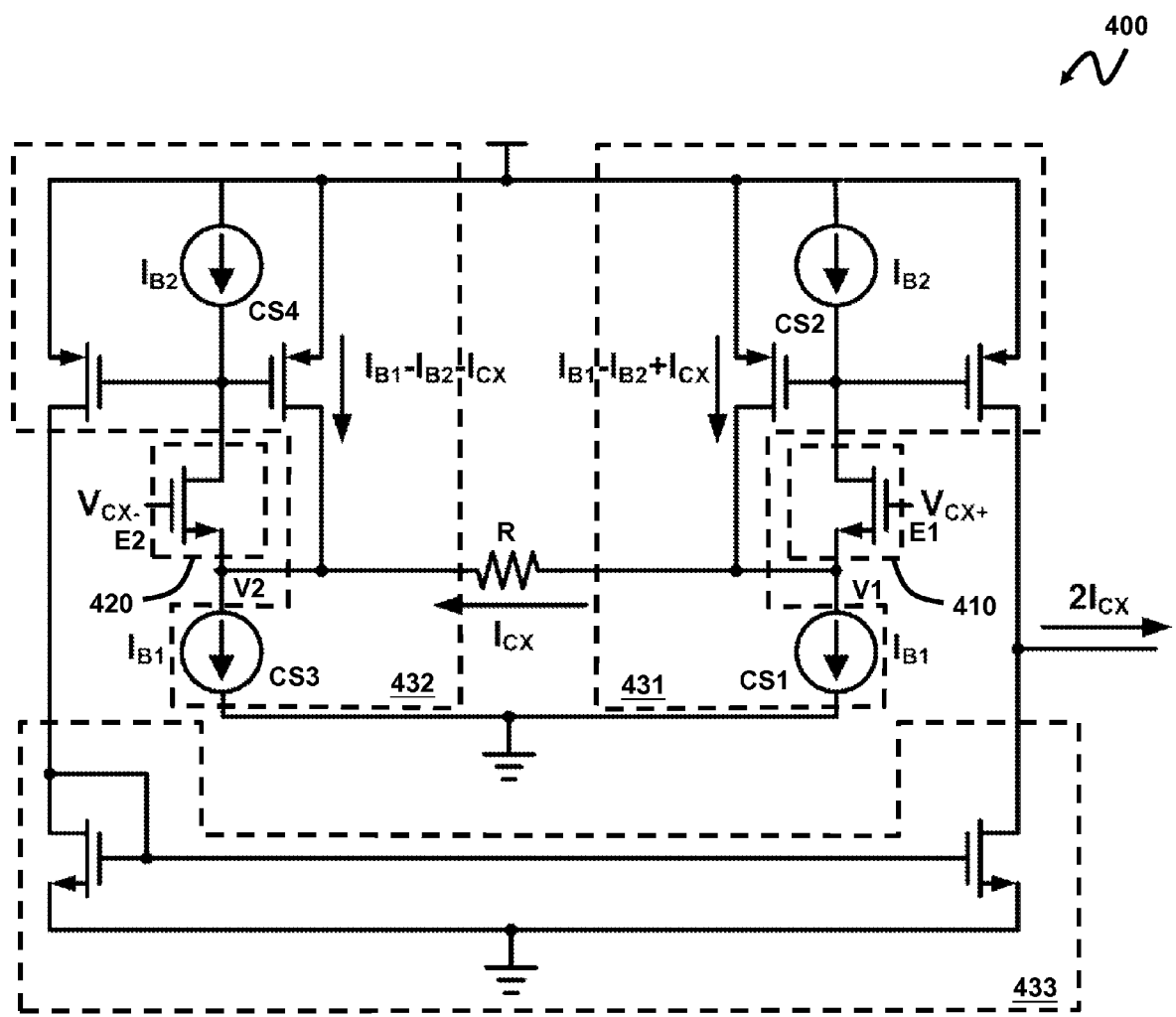
FIG. 7 shows a droop circuit according to yet another embodiment of the present invention.

FIG. 7 shows a droop circuit 400 according to yet another embodiment of the present invention. As shown in FIG. 7, the droop circuit 400 comprises a phase buffer circuit 410, an output buffer circuit 420 and the converter circuit. The phase buffer circuit 410 includes, for example but not limited to, an N-type metal-oxide-semiconductor (NMOS) device. The output buffer circuit 420 also includes, for example but not limited to, an NMOS device as shown in FIG. 7. The converter circuit includes a resistor R. When the common node terminal E1 of the phase buffer circuit 410 (e.g., the gate of the NMOS device) receives the common node voltage Vcx+ at the common node CN, the first carrier inflow terminal of the phase buffer circuit 410 (e.g., the source of the NMOS device) generates a first voltage V1 at one end of the resistor R according to the common node voltage Vcx+. Also, when the output node terminal E2 (e.g., the gate of the NMOS device) of the output buffer circuit 420 receives the output voltage Vcx− at the output node Vout, the second carrier inflow terminal (e.g., the source of the NMOS device) of the output buffer circuit 420 generates a second voltage V2 at another end of the resistor R according to the output voltage Vcx−. Accordingly, the voltage difference across the resistor R is substantially the same as the capacitor voltage Vcx. The droop current Icx flowing through the resistor R (or a multiple of the current Icx) can be used as the droop signal Droop.

Please refer again to FIG. 7. In addition to the resistor R, the converter circuit of this embodiment further includes a first current mirror circuit 431, a second current mirror circuit 432 and a third current mirror circuit 433. As shown in FIG. 7, the first current mirror circuit 431 is coupled to the phase buffer circuit 410. The first current mirror circuit 431 comprises two PMOS devices coupled with each other, a first constant current source CS1 and a second constant current source CS2. The first constant current source CS1 provides a first constant current IB1, and the second constant current source CS2 provides a second constant current IB2. The first current mirror circuit 431 generates a first current mirror signal IB1-IB2+Icx according to the first voltage V1 and the droop current Icx generated on the resistor R. In addition, the second current mirror circuit 432 comprises two PMOS devices coupled with each other, a third constant current source CS3 and a fourth constant current source CS4. The third constant current source CS3 provides a third constant current IB1; in this embodiment, the third constant current IB1 is substantially the same as the first constant current IB1. The fourth constant current source CS4 provides a fourth constant current IB2; in this embodiment, the fourth constant current IB2 is substantially the same as the second constant current IB2. The second current mirror circuit 432 generates a second current mirror signal IB1-IB2−Icx according to the second voltage V2 and the droop current Icx generated on the resistor R. The third current mirror circuit 433 is coupled to the first current mirror circuit 431 and the second current mirror circuit 432, and it subtracts the second current mirror signal IB1-IB2−Icx from the first current mirror signal IB1-IB2+Icx, to generate the droop signal 2Icx.

The present invention, as compared with the prior art circuits discussed in the above, has the advantage that there is no substantial current flowing through the common node terminal of the phase buffer circuit and the output node terminal of the output buffer circuit, which ensures that no current path is formed between the output node Vout and the phase buffer circuit and the output buffer circuit. Accordingly, when the multi-phase switching regulator of the present invention operates under discontinuous conduct mode (DCM) or in low load condition, no leakage current occurs. In addition, when it is desired for the multi-phase switching regulator to detect a negative current, it will not charge the output voltage to an undesired high voltage level. Hence, the present invention improves the stability of the output voltage.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. For example, a device which does not substantially influence the primary function of a signal can be inserted between any two devices in the shown embodiments, such as a switch. For another example, in the aforementioned embodiments, PMOS devices and NMOS devices can be interchanged between each other and MOS devices can be replaced by BJT devices. In view of the foregoing, the spirit of the present invention should cover all such and other modifications and variations, which should be interpreted to fall within the scope of the following claims and their equivalents.

What is claimed is:

1. A multi-phase switching regulator, comprising:
   a plurality of switch sets for generating an output voltage at an output node, wherein each switch set includes at least one power switch and a phase node, and each switch set receives a corresponding driving signal to operate the corresponding at least one power switch thereof for generating the output voltage;
   a plurality of output inductors, which are coupled between the corresponding phase nodes and the output node respectively;
   a pulse width modulation (PWM) circuit for generating a plurality of PWM signals to control the plurality of switch sets; and a droop circuit for providing a droop signal, the droop signal being related to a sum of currents through the phase nodes, the droop circuit including:
- a plurality of phase resistors, which are respectively coupled between the corresponding phase nodes and a common node, and each of which is for sensing a current generated by the corresponding switching set through the corresponding phase node;
- a droop capacitor, which is coupled between the common node and the output node;
- a phase buffer circuit, which has a common node terminal coupled to the common node for receiving a common node voltage at the common node, wherein the phase buffer circuit generates a first voltage according to the common node voltage;
- an output buffer circuit, which has an output node terminal coupled to the output node for receiving the output voltage, wherein the output buffer circuit generates a second voltage according to the output voltage; and
- a converter circuit, which receives the first voltage and the second voltage and generates the droop signal;
- wherein there is no substantial current flowing through the common node terminal and the output node terminal.

2. The multi-phase switching regulator of claim 1, wherein the phase buffer circuit includes a metal-oxide-semiconductor (MOS) device or a bipolar junction transistor (BJT) device, and the output buffer circuit includes a metal-oxide-semiconductor (MOS) device or a bipolar junction transistor (BJT) device.

3. The multi-phase switching regulator of claim 1, wherein the converter circuit includes a resistor.

4. The multi-phase switching regulator of claim 3, wherein the converter circuit further includes:
- a first current mirror circuit coupled to the phase buffer circuit, for generating a first current mirror signal according to the first voltage;
- a second current mirror circuit coupled to the output buffer circuit, for generating a second current mirror signal according to the second voltage; and
- a third current mirror circuit coupled to the first current mirror circuit and the second current mirror circuit, for generating the droop signal according to the first current mirror signal and the second current mirror signal.

5. The multi-phase switching regulator of claim 4, wherein:
the first current mirror circuit comprises a first constant current source for providing a first constant current and a second constant current source for providing a second constant current, the first constant current source being coupled to a first carrier inflow terminal of the phase buffer circuit and being for providing the first constant current flowing through the first carrier inflow terminal, the second constant current source being coupled to a first carrier outflow terminal of the phase buffer circuit and being for providing the second constant current flowing through the first carrier outflow terminal; and
the second current mirror circuit comprises a third constant current source for providing a third constant current and a fourth constant current source for providing a fourth constant current, the third constant current source being coupled to a second carrier inflow terminal of the output buffer circuit and being for providing the third constant current flowing through the second carrier inflow terminal, the fourth constant current source being coupled to a second carrier outflow terminal of the output buffer circuit and being for providing the fourth constant current flowing through the second carrier outflow terminal;
wherein the third constant current is substantially the same as the first constant current and the fourth constant current is substantially the same as the second constant current.

6. A droop circuit for use in a multi-phase switching regulator, the multi-phase switching regulator comprising a plurality of switch sets, a plurality of output inductors, a pulse width modulation (PWM) circuit, and the droop circuit, the plurality of switch sets being for generating an output voltage at an output node, wherein each switch set includes at least one power switch and a phase node, and each switch set receives a corresponding driving signal to operate the corresponding at least one power switch thereof for generating the output voltage; the plurality of output inductors being coupled between the corresponding phase nodes and the output node respectively; the PWM circuit being for generating a plurality of PWM signals to control the plurality of switch sets; the droop circuit being for providing a droop signal, and the droop circuit comprising:
- a plurality of phase resistors, which are respectively coupled between the corresponding phase nodes and a common node, and each of which is for sensing a current generated by the corresponding switching set through the corresponding phase node;
- a droop capacitor, which is coupled between the common node and the output node;
- a phase buffer circuit, which has a common node terminal coupled to the common node for receiving a common node voltage at the common node, wherein the phase buffer circuit generates a first voltage according to the common node voltage;
- an output buffer circuit, which has an output node terminal coupled to the output node for receiving the output voltage, wherein the output buffer circuit generates a second voltage according to the output voltage; and
- a converter circuit, which receives the first voltage and the second voltage and generates the droop signal;
- wherein the droop signal is related to a sum of currents through the plurality of phase nodes.

7. The droop circuit of claim 6, wherein the phase buffer circuit includes a metal-oxide-semiconductor (MOS) device or a bipolar junction transistor (BJT) device, and the output buffer circuit includes a metal-oxide-semiconductor (MOS) device or a bipolar junction transistor (BJT) device.

8. The droop circuit of claim 6, wherein the converter circuit includes a resistor.

9. The droop circuit of claim 8, wherein the converter circuit further includes:
- a first current mirror circuit coupled to the phase buffer circuit, for generating a first current mirror signal according to the first voltage;
- a second current mirror circuit coupled to the output buffer circuit, for generating a second current mirror signal according to the second voltage; and
- a third current mirror circuit coupled to the first current mirror circuit and the second current mirror circuit, for generating the droop signal according to the first current mirror signal and the second current mirror signal.

10. The droop circuit of claim 9, wherein:
the first current mirror circuit comprises a first constant current source for providing a first constant current and a second constant current source for providing a second constant current, the first constant current source being coupled to a first carrier inflow terminal of the phase buffer circuit and being for providing the first constant current flowing through the first carrier inflow terminal, the second constant current source being coupled to a first carrier outflow terminal of the phase buffer circuit and being for providing the second constant current flowing through the first carrier outflow terminal; and
the second current mirror circuit comprises a third constant current source for providing a third constant current and a fourth constant current source for providing a fourth constant current, the third constant current source being coupled to a second carrier inflow terminal of the output buffer circuit and being for providing the third constant current flowing through the second carrier inflow terminal, the fourth constant current source being coupled to a second carrier outflow terminal of the output buffer circuit and being for providing the fourth constant current flowing through the second carrier outflow terminal;
wherein the third constant current is substantially the same as the first constant current and the fourth constant current is substantially the same as the second constant current.

* * * * *